United States Patent [19]
Perfitt

[11] 3,721,985
[45] March 20, 1973

[54] NAVIGATIONAL SYSTEM

[75] Inventor: Thomas E. Perfitt, Grand Rapids, Mich.

[73] Assignee: Lear Siegler, Inc., Grand Rapids, Mich.

[22] Filed: June 22, 1970

[21] Appl. No.: 48,409

[52] U.S. Cl..........343/103, 235/150.272, 343/105 R, 343/112 C
[51] Int. Cl................................................G01s 1/24
[58] Field of Search.........343/103, 105, 5 LS, 112 C; 235/150.271, 150.272

[56] References Cited

UNITED STATES PATENTS 3,400,399  9/1968  Kline............................343/105 R X
3,384,891  5/1968  Anderson.....................343/103 UX

*Primary Examiner*—Benjamin A. Borchelt
*Assistant Examiner*—Richard E. Berger
*Attorney*—Wilfred O. Schmidt

[57] ABSTRACT

Loran navigational signals are received at a destination and at dirigible craft traveling towards that destination. The time differences between signals received at the destination are calculated. Upon receipt of a signal from a master station, these time differences at the destination are signaled to the craft by a data link or slave signal. The craft also receives the signal from the master station. The relative positions of the destination and the craft are determined in accordance with Loran navigation techniques. This position information is then utilized, along with the time difference information transmitted to the craft simultaneously with the master signal by the data link or slave signal, and the slant range between the craft and the destination is then computed. Altitude of the craft is then computed, as by triangulation. The slant range rate is determined by measuring the Doppler shift in the frequency of the data link or slave signal.

23 Claims, 2 Drawing Figures

PATENTED MAR 20 1973  3,721,985

INVENTOR.
THOMAS E. PERFITT
BY
ATTORNEY

NAVIGATIONAL SYSTEM

BACKGROUND

This invention pertains to a system for navigating a dirigible craft, i.e. steerable craft, to a destination. In particular, the system may be used for terminal area navigation once the craft initiates its landing or homing pattern.

Loran signaling stations and navigational satellites are now commonly used to determine position "fixes" for a moving vehicle such as an aircraft or an aircraft carrier relative to a known fixed reference position. These systems can also be used to determine the relative positions of two moving vehicles, such as the relative position of an aircraft with respect to a moving destination such as an aircraft carrier.

However, accurate navigation, particularly in the terminal area, requires additional information such as slant range, slant range rate and altitude. Slant range refers to the direct line distance between the craft and its destination. This is in contrast to the distance between the relative positions on the earth's surfaces, of the craft and its destination, which might be called the surface distance between the craft and its destination.

Slant range and slant range rate, i.e. the rate at which the slant range is changing, can presently be determined by using ground-based radar or other similar distance-measuring equipment, the slant range being determined at the destination and then radioed to the aircraft. Unfortunately, the equipment necessary for this is quite complicated and expensive. More importantly, such a system can become saturated with users, and the results of such saturation can be chaotic.

In the alternative, radar or comparable distance-measuring equipment could be carried in the craft. Again, however, complicated, expensive and heavy equipment would be required. Special reflectors would be required at the destination so that it could be distinguished from other ground objects. One of the greatest drawbacks in using such a system for tactical purposes, however, would be the fact that the craft would be emitting electromagnetic radiation. It would be much more desirable if the craft were passive and did not have to emit such signals.

Altitude can presently be determined using barometric altimeters, but as is well known, these instruments suffer unpredictable errors due to pressure anomalies and turbulence caused by other aircraft. An airborne radar altimeter could be used, but again, this suffers the drawbacks of any radar, as outlined above. Additionally, knowledge of the ground terrain would be required in order for such a system to establish height above destination with any reasonable accuracy.

SUMMARY

The present invention comprises a system which can be used to determine slant range, slant range rate, and altitude, all without using prior art equipment such as radar or altimeter instruments. A master signaling station, having a known position, emits a signal which is received both by the dirigible craft and its destination. When it is received at the destination, a slave signal is emitted from the destination and is thereafter received at the craft. The relative surface positions during approach of the craft toward the destination are determined. The slant range is then determined, based on these relative positions and on the times at which the master and slave signals are received at the craft.

The slant range and the relative positions of the craft and its destination can then be used to determine altitude by triangulation. Slant range rate can be determined by measuring the Doppler shift in the frequency of the received slave signal.

The present invention provides for determining slant range, slant range rate and altitude by utilizing Loran navigational equipment which is already in existence. Other navigational systems such as navigation satellites could also be used with equal efficiency.

The only non-Loran equipment necessary in a preferred embodiment of this system is a slave signal transmitter, an onboard receiver on the craft and an onboard data processor on the craft. The craft is completely passive in this system, emitting no electromagnetic radiation. Complicated radar systems are unnecessary, and the system cannot become saturated with users.

BRIEF DESCRIPTION OF THE DRAWINGS

The foregoing and other objects and advantages of the invention can be better appreciated by reference to the following specification and the appended drawings, wherein.

PREFERRED EMBODIMENT

Figure 1:
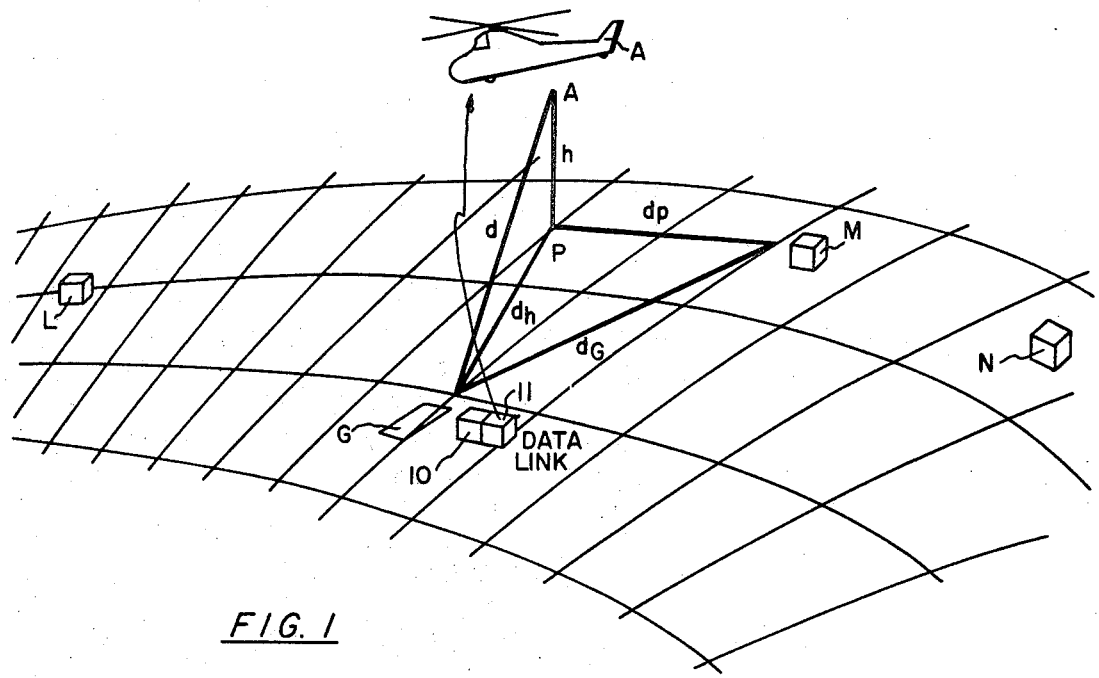
FIG. 1 is a pictorial schematic representation showing the components of the system relative to the face of the earth.

Referring to FIG. 1, it can be seen that a dirigible craft A is navigating towards a destination G. A grouping of Loran signaling stations L, M and N, which are well-known in present-day navigation, is deployed at known positions on the surface of the earth, as is true as a matter of actuality.

Figure 2:
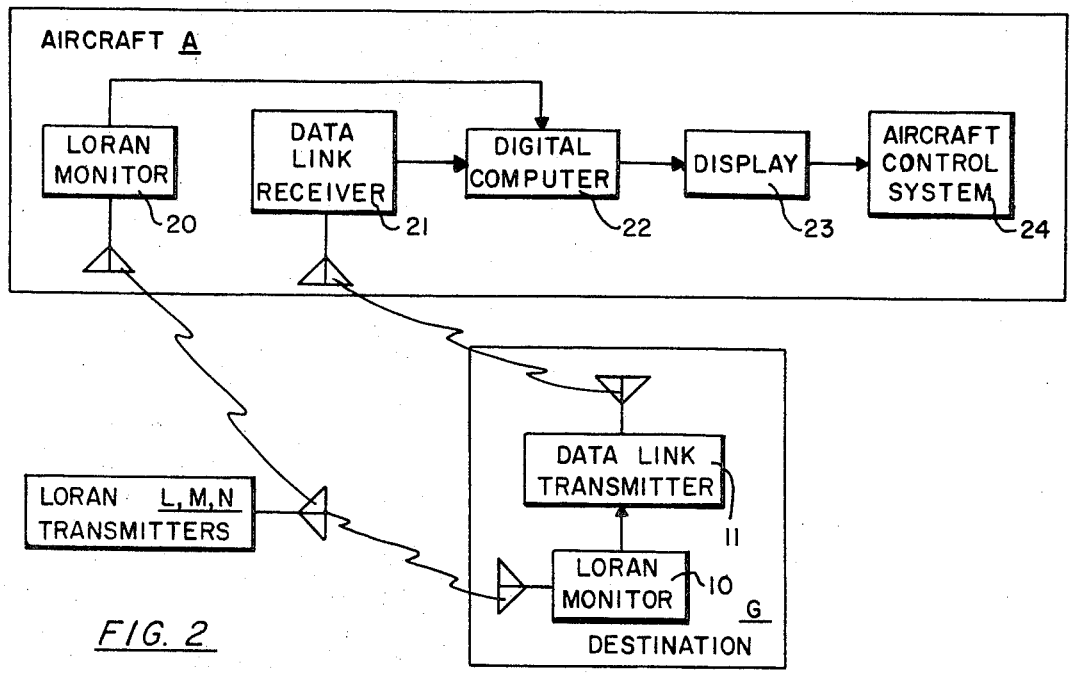
FIG. 2 is a schematic block diagram showing the basic components and the operation of the system.

As can be seen in both FIGS. 1 and 2, the destination G has a standard Loran monitor 10 and a data link transmitter 11. The data link 11 is electronically tied to the Loran monitor 10 such that it emits a signal simultaneously with the receipt at the Loran monitor of a single from Loran transmitter M. The system could be coded such that transmission from data link transmitter 11 could occur simultaneously with the receipt of a signal from either station L or N.

Dirigible craft A also carries a Loran monitor, designated by the numeral 20 in FIG. 2. Additionally, it carries a data link receiver 21 which includes a calibrated oscillator (not shown), such that the Doppler shift in the frequency of the received data link signal can be determined. Also carried by craft A is a digital computer 22 and a display 23 controlled by the computer, whereby calculated information is displayed to a flight engineer or pilot. Finally, the computed information is used in a craft control system 24, which may be either manual or automatic.

In use, the operation of the invention is as follows. Signals from Loran stations L, M and N are received by Loran monitor 10 at destination G at times $t_{MG}$, $t_{LG}$ and $t_{NG}$. The differences in the times at which these signals are received, $TD_{G1}$ and $TD_{G2}$, are then computed in a manner and by equipment which is customarily used for such computations in Loran navigational systems.

$$TD_{G1} = t_{MG} - t_{LG}$$

$$TD_{G2} = t_{MG} - t_{NG}$$

The time differences $TD_{G1}$ and $TD_{G2}$ are then transmitted to craft A. This transmission is accomplished by data link transmitter 11, and transmission is synchronized with the receipt of a second signal from Loran station M which acts as a master station. The combined system, i.e. data link transmitter 11 and Loran monitor 10, is wired and coded such that upon receipt of a signal from station M, the data $TD_{G1}$ and $TD_{G2}$ is simultaneously transmitted to craft A by data link transmitter 11. In effect, the signal received at destination G from station M is a master signal while the signal transmitted by data link transmitter 11 is a slave signal. It should be noted that the system would operate equally as well if the master signal were provided by station L or station N.

The data link signal is received at craft A by data link receiver 21. The data which it carries, i.e. $TD_{G1}$ and $TD_{G2}$, is then fed into digital computer 22 where it is used to compute the coordinates of the position of destination G.

The same Loran navigational signals from stations L, M and N which are received at destination G, are also received at craft A, at times $t_{MA}$, $t_{LA}$, and $t_{NA}$. As above, time differences $TD_{P1}$ and $TD_{P2}$ are computed.

$$TD_{P1} = t_{MA} - t_{LA}$$

$$TD_{P2} = t_{MA} - t_{NA}$$

This information, $TD_{P1}$ and $TD_{P2}$, is also fed into digital computer 22 such that the coordinates of the position of craft A can be determined.

Since the position of master station M is known, and since the instantaneous position of destination G has been determined by digital computer, the instantaneous distance $d_G$ between the two can be readily determined (FIG. 1). Similarly, since the coordinates of craft A have been determined by digital computer, the distance $d_p$ between its projected position P on the earth's surface and master station M can also readily be determined. Finally, the surface distance $d_h$ between point P and destination G can be determined, based on the previously determined positions of point P and destination G.

The slant range $d$ between craft A and destination G can be determined by subtracting the time of transmission of the slave or data link signal from destination G, which occurs at time $t_{MG}$, from the time at which the slave signal is received at A, $t_{GA}$, and multiplying the difference by $C$, the speed of light:

$$d = C(t_{GA} - t_{MG})$$

The time at which the slaved data link signal is transmitted, $t_{MG}$, is the same as the time at which the master signal was received at destination G from master station M. Since the master signal was also received at craft A, and since the distance $d_p$ is known, the time at which the master signal was emitted, $T_M$ can be determined by dividing $d_p$ by $C$ and subtracting the latter from the time at which the master signal was received at A, $t_{MA}$.

$$T_M = t_{MA} - d_p/C$$

The time at which the master signal was received at destination G, $t_{MG}$, can now be determined by dividing $d_G$ by $C$ and adding the latter to the time at which the master signal was transmitted, $T_M$.

$$t_{MG} = T_M + d_G/C$$

$$= t_{MA} + (d_G - d_p)/C$$

Thus, the formula for determining the slant range $d$ can be expressed as follows:

$$d = C[t_{GA} - t_{MA} - (d_G - d_p)/C]$$

$$= C(t_{GA} - t_{MA}) + (d_p - d_G)$$

With slant range d known, the altitude $h$ of craft A can now be determined by triangulation, utilizing the distances $d$ and $d_h$.

As previously discussed, the data link receiver 21 at craft A includes a calibrated oscillator system which oscillates at the frequency of the signal transmitted by the data link transmitter at destination G. This system compares the frequency of the data link signal as received at craft A to that of the calibrated oscillator and thereby determines the Doppler shift in the data link signal frequency. This information is also fed into digital computer 22 at craft A, which then determines the rate with which slant range $d$ is changing.

As will be apparent from the above analysis, the system operates on certain basic assumptions. The distances between Loran stations L, M, N and destination G must all be much greater than either distances $d_h$ or $h$ in order for the equations to be applicable. The system is also subject to certain errors. For example, if altitude $h$ is small with respect to the distance $d_h$, small measurement errors in either slant range $d$ or distance $d_h$ will cause large errors in the determination of altitude $h$. Also, oscillator drift in either the data link transmitter or the data link receiver will cause apparent Doppler frequency drifts and hence, large range rate errors.

All of these errors, however, can be essentially eliminated by combining redundant range and range rate information with further redundant airborne inertial measurements. These latter measurements might be taken, for example, from an inertial navigation system on board craft A. This combined redundant information may be fed into the computer for error estimation, accomplished by using a program such as a quasi-linear Kalman filter or other suitable non-linear filter. An explanation of the Kalman filter can be found in Optimal Estimation, Identification and Control, by Robert C. K. Lee, MIT Press, Cambridge, Mass. (1964), pages 38 through 49. Use of this technique will substantially eliminate any errors in slant range, altitude or slant range rate.

Thus it can be seen that the present invention provides a highly accurate three-dimensional terminal area navigation system. Existing navigational systems such as Loran can be used, and the necessity of substantial investments in equipment is thus eliminated. Only a single installation of equipment is required at a destination G. Finally, since the onboard equipment is passive, an infinite number of craft can use the system in the terminal area without ground equipment saturation. Indeed, it is conceivable that, with modifications, the system could even be used to provide collision information to craft.

It is to be understood that the above is merely a description of a preferred embodiment of the invention, and that many changes and alterations can be made in such embodiment, and that other embodiments of the invention may be quite feasible, without departing from the broader aspects or spirit of the invention, as defined in the following claims.

The embodiments of the invention in which an exclusive property or privilege is claimed are defined as follows:

1. A method of navigating a dirigible craft at an altitude above ground level to a destination at ground level, comprising the steps: receiving signals at said destination from a predetermined number of sending stations at ground level having known locations, and simultaneously emitting a slave signal from said destination upon receipt of at least one such signal; receiving said station signals at said dirigible craft; receiving said slave signal at said craft; using the received signals to determine the position of said destination with respect to at least one of said stations; using the received signals to determine the coordinate position of said craft with respect to at least one of said stations; and determining the slant range of said craft from said destination, based on the relative coordinate positions of said craft and said destination and based on the times at which certain of said signals are received at said craft.

2. The method of claim 1 in which information as to the relative position of said destination is determined at said destination and is then transmitted to said craft.

3. The method of claim 2 in which said slave signal carries to said craft information as to the respective position of said destination.

4. The method of claim 1 in which navigational information is received at said destination and transmitted from said destination to said craft, and the determination of the relative position of said destination is performed at said craft.

5. The method of claim 4 in which said slave signal carries to said craft said information received at said destination.

6. A method of navigating a dirigible craft to a destination, comprising the steps: receiving signals at said destination from a predetermined number of sending stations having known locations, and simultaneously emitting a slave signal from said destination upon receipt of at least one such signal; receiving said station signals at said dirigible craft; receiving said slave signal at said craft; using the received signals to determine the position of said destination with respect to at least one of said stations; using the received signals to determine the position of said craft with respect to at least one of said stations; determining the slant range of said craft from said destination, based on the relative positions of said craft and said destination and based on the times at which certain of said signals are received at said craft; using the said determination of position for said destination and said craft to determine the surface distance between said respective positions; and using said surface distance and said slant range to determine the altitude of said craft.

7. The method of claim 6 in which said slave signal carries to said craft information as to the respective position of said destination.

8. The method of claim 7 in which said steps of determining the surface distance between said craft and said destination and determining the altitude of said craft are performed at said craft.

9. A method of navigating a dirigible craft to a destination, comprising the steps: receiving signals at said destination from a predetermined number of sending stations having known locations, and simultaneously emitting a slave signal from said destination upon receipt of at least one such signal; receiving said station signals at said dirigible craft; receiving said slave signal at said craft; using the received signals to determine the position of said destination with respect to at least one of said stations; using the received signals to determine the position of said craft with respect to at least one of said stations; determining the slant range of said craft from said destination, based on the relative positions of said craft and said destination and based on the times at which certain of said signals are received at said craft; measuring the Doppler shift in the frequency of said slave signal received at said craft; and using the measurement of said Doppler shift to determine the rate of change of said slant range.

10. The method of claim 9 in which said slave signal carries to said craft information as to the respective position of said destination.

11. The method of claim 10 in which a calibrated oscillator is used in said measuring of Doppler shift.

12. A method of navigating a dirigible craft at an altitude above ground level to a destination at ground level by use of navigational signaling stations such as Loran stations at ground level, said method comprising: receiving at said destinations, signals from said navigational stations; determining data as to the arrival time of said signals at said destination and transmitting such data by a data link signal simultaneously with the receipt at said destination of a signal from a predetermined one of said stations; receiving at said dirigible craft signals from said navigational stations, including said predetermined one of said stations; receiving said data link signal at said craft; determining the position of said destination with respect to said one station by use of said data received from said destination; determining the relative coordinate position of said craft with respect to said one station by use of data as to the arrival time of said signals at said craft; determining the slant range between said craft and said destination by use of the said determined relative positions of said craft and said destination and by use of the times at which said signal from said one station and said data link signal are received at said craft.

13. The method of claim 12 which includes: using the said determination of position for said destination and said craft to determine the surface distance between said respective positions; and using said surface distance and said slant range to determine the altitude of said craft.

14. The method of claim 12 which includes measuring the Doppler shift in the frequency of said data link signal received at said craft; and using the measurement of said Doppler shift to determine the rate of change of said slant range.

15. The method of claim 12 which includes: eliminating errors in said slant range determination by using a computer for calculating said relative positions of said craft and said destination and for calculating said slant range; programming said computer with a non-linear filter program; and feeding redundant range information into said non-linear filter in order to estimate and eliminate errors.

16. A navigational system for use by a dirigible craft at an altitude above ground level in navigating to a destination at ground level, comprising in combination: means at said destination for receiving a master signal from a master signal-emitting station at a known ground level position; means for emitting a slave signal from said destination simultaneously with receipt at said destination of said master signal; means for receiving said master signal at said dirigible craft; means for receiving said slave signal at said craft; means for determining the relative position of said destination with respect to said position of master signal station; means for determining the relative coordinate position of said craft with respect to said master signal station position; and means for determining the slant range between said craft and said destination based on the relative coordinate positions of said craft and said destination and on the times at which said master and said slave signals are received at said craft.

17. The system of claim 16, wherein said means for determining said relative position of said destination is located at the latter; and wherein said system includes means for transmitting data, including said relative position of said destination, from said destination to said craft.

18. The system of claim 17, in which said means for emitting said slave signal and said data-transmitting means comprise an integrated signaling means for transmission of said data as part of said slave signal.

19. The system of claim 16 which includes: means at said craft for determining the Doppler shift in the frequency of said slave signal; and computer means for determining the rate of change of said slant range based on said Doppler shift.

20. The system of claim 16 which includes means at said craft for determining the altitude of said craft based on said slant range and said relative positions of said destination and said craft.

21. A navigational system for use by a dirigible craft at an altitude above ground level, in navigating to a particular destination at ground level by use of existing navigational signal-emitting stations, said system comprising: receiver means at said destination for receiving navigational signals from navigational signaling stations at known positions; a data link transmitter means at said destination for sending data related to the times at which said signals are received by said receiver means; means for causing said data transmission to occur simultaneously with the receipt of a signal from a predetermined one of said navigational signaling stations; receiver means at said craft for receiving said navigational signals from said navigational signaling stations; and computer means at said craft for determining relative coordinate positions of said destination and craft based on said transmitted data and on the arrival times of said navigational signals, and for determining the slant range between said craft and said destination based on said relative positions of said craft and said destination and on the arrival times of said predetermined one signal and said data transmission signal at said craft.

22. The system of claim 21 which includes: means at said craft for determining the Doppler shift in the frequency of said slave signal; and computer means for determining the rate of change of said slant range based on said Doppler shift.

23. The system of claim 21 which includes means at said craft for determining the altitude of said craft based on said slant range and said relative positions of said destination and said craft.

* * * * *